US010592518B2

(12) United States Patent
Posse et al.

(10) Patent No.: US 10,592,518 B2
(45) Date of Patent: Mar. 17, 2020

(54) SUGGESTING CANDIDATE PROFILES SIMILAR TO A REFERENCE PROFILE

(71) Applicant: Microsoft Technology Licensing, LLC, Redmond, WA (US)

(72) Inventors: Christian Posse, Forster City, CA (US); Abhishek Gupta, San Francisco, CA (US); Anmol Bhasin, Los Altos, CA (US); Monica Rogati, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 198 days.

(21) Appl. No.: 15/692,084

(22) Filed: Aug. 31, 2017

(65) Prior Publication Data

US 2017/0364521 A1    Dec. 21, 2017

Related U.S. Application Data

(63) Continuation of application No. 15/364,621, filed on Nov. 30, 2016, now Pat. No. 9,811,569, which is a (Continued)

(51) Int. Cl.
*G06F 16/00* (2019.01)
*G06F 16/2457* (2019.01)
(Continued)

(52) U.S. Cl.
CPC ...... *G06F 16/24578* (2019.01); *G06F 16/248* (2019.01); *G06F 16/9535* (2019.01); *H04L 67/22* (2013.01); *H04L 67/306* (2013.01)

(58) Field of Classification Search
None
See application file for complete search history.

(56) References Cited

U.S. PATENT DOCUMENTS 7,797,642 B1    9/2010   Karam et al.
8,972,414 B2    3/2015   Posse et al.
(Continued)

OTHER PUBLICATIONS

"U.S. Appl. No. 13/194,883, Advisory Action dated Aug. 27, 2013", 3 pgs.
(Continued)

*Primary Examiner* — Bai D Vu
(74) *Attorney, Agent, or Firm* — Schwegman Lundberg & Woessner, P.A.

(57) ABSTRACT

Techniques for identifying and presenting member profiles similar to a source member profile are described. With some embodiments, a general recommendation engine is used to extract features from member profiles, and then store the extracted features, including any computed, derived or retrieved profile features, in an enhanced member profile. In real-time, the general recommendation engine processes client requests to identify member profiles similar to a source member profile by comparing select profile features stored in the enhanced member profile with corresponding profile features of the source member profile, where the comparison results in several similarity sub-scores that are then combined in accordance with directives set forth in a configuration file. Finally, the member profiles with the highest similarity scores corresponding with the user-selected member profile are selected, and in some instances, presented to a user.

20 Claims, 7 Drawing Sheets

Related U.S. Application Data continuation of application No. 14/602,661, filed on Jan. 22, 2015, now Pat. No. 9,544,392, which is a continuation of application No. 13/194,883, filed on Jul. 29, 2011, now Pat. No. 8,972,414.

(51) Int. Cl.
　　*G06F 16/248*　　(2019.01)
　　*G06F 16/9535*　　(2019.01)
　　*H04L 29/08*　　(2006.01)

(56) References Cited

U.S. PATENT DOCUMENTS

| | | | |
|---|---|---|---|
| 8,996,529 | B2 | 3/2015 | Gross et al. |
| 9,544,392 | B2 | 1/2017 | Posse et al. |
| 2006/0210125 | A1 | 9/2006 | Heisele |
| 2010/0332258 | A1 | 12/2010 | Dahlke et al. |
| 2011/0119264 | A1 | 5/2011 | Hu et al. |
| 2011/0125763 | A1 | 5/2011 | Takanen et al. |
| 2012/0185777 | A1 | 7/2012 | Banerjee |
| 2013/0031090 | A1 | 1/2013 | Posse et al. |
| 2015/0134745 | A1 | 5/2015 | Posse et al. |
| 2017/0124089 | A1 | 5/2017 | Posse et al. |

OTHER PUBLICATIONS

"U.S. Appl. No. 13/194,883, Appeal Brief filed Jul. 14, 2014", 17 pgs.

"U.S. Appl. No. 13/194,883, Final Office Action dated Jun. 13, 2013", 17 pgs.

"U.S. Appl. No. 13/194,883, Non Final Office Action dated Dec. 14, 2012", 18 pgs.

"U.S. Appl. No. 13/194,883, Notice of Allowance dated Oct. 24, 2014", 9 pgs.

"U.S. Appl. No. 13/194,883, Response Filed Apr. 15, 2013 to Non-Final Office Action dated Dec. 14, 2012", 12 pgs.

"U.S. Appl. No. 13/194,883, Response filed Aug. 14, 2013 to Final Office Action dated Jun. 13, 2013", 12 pgs.

"U.S. Appl. No. 14/602,661, Examiner Interview Summary dated Aug. 30 2016", 3 pgs.

"U.S. Appl. No. 14/602,661, Non Final Office Action dated Jul. 15, 2016", 6 pgs.

"U.S. Appl. No. 14/602,661, Notice of Allowance dated Oct. 24, 2016", 8 pgs.

"U.S. Appl. No. 14/602,661, Preliminary Amendment filed Feb. 3, 2015", 11 pgs.

"U.S. Appl. No. 14/602,661, Response Filed Oct. 10, 2016 to Non-Final Office Action dated Jul. 15, 2016", 12 pgs.

"U.S. Appl. No. 15/364,621, Non Final Office Action dated Apr. 4, 2017", 9 pgs.

"U.S. Appl. No. 15/364,621, Notice of Allowance dated Jul. 10, 2017", 8 pgs.

"U.S. Appl. No. 15/364,621, Preliminary Amendment filed Jan. 24, 2017", 10 pgs.

"U.S. Appl. No. 15/364,621, Response filed May 5, 2017 to Non Final Office Action dated Apr. 4, 2017", 10 pgs.

http://www.thenet.com/profile~Joe_Hansen

MEMBER PROFILES SIMILAR TO JOE HANSEN

FILTER CRITERIA

CURRENT
Electronic Arts ☐
Games R Great ☐
Zynga ☐

PAST
Microsoft ☐
Google ☐

EDUCATION
U of Michigan ☐
Buck CC ☐
Harvard ☐

Ted Smith
Software Engineer
Palo Alto, CA | Internet

Current: Electronic Arts
Past: Microsoft
Education: U of Michigan
Connections: 212

Larry Johnson
Software Engineer
San Jose, CA | Internet

Current: Games R Great
Past: Google
Education: Buck Community Co
Connections: 19

Shawn P.D. Glidden
Software Engineer
San Mateo, CA | Internet

Current: Zynga
Past: Google
Education: Harvard
Connections: 519

FIG. 6

SUGGESTING CANDIDATE PROFILES SIMILAR TO A REFERENCE PROFILE

RELATED APPLICATIONS

This application is a Continuation of U.S. patent application Ser. No. 15/364,621, filed on Nov. 30, 2016, which is a Continuation of U.S. patent application Ser. No. 14/602,661, filed on Jan. 22, 2015 and issued as U.S. Pat. No. 9,544,392, which is a Continuation of U.S. patent application Ser. No. 13/194,883, filed on Jul. 29, 2011 and issued on Mar. 3, 2015 as U.S. Pat. No. 8,972,414, all of which are incorporated herein by reference in their entirety.

TECHNICAL FIELD

The present disclosure generally relates to data processing systems. More specifically, the present disclosure relates to methods, systems and computer program products for identifying one or more member profiles of an online social networking service, or business networking service, that are similar to another source member profile.

BACKGROUND

A social networking service is a computer- or web-based application that enables users to establish links or connections with persons for the purpose of sharing information with one another. Some social networks aim to enable friends and family to communicate with one another, while others are specifically directed to business users with a goal of enabling the sharing of business information. For purposes of the present disclosure, the terms "social network" and "social networking service" are used in a broad sense and are meant to encompass services aimed at connecting friends and family (often referred to simply as "social networks"), as well as services that are specifically directed to enabling business people to connect and share business information (also commonly referred to as "social networks" but sometimes referred to as "business networks").

With many social networking services, members are prompted to provide a variety of personal information, which may be displayed in a member's personal web page. Such information is commonly referred to as personal profile information, or simply "profile information", and when shown collectively, it is commonly referred to as a member's profile. For example, with some of the many social networking services in use today, the personal information that is commonly requested and displayed includes a member's age, gender, interests, contact information, home town, address, the name of the member's spouse and/or family members, and so forth. With certain social networking services, such as some business networking services, a member's personal information may include information commonly included in a professional resume or curriculum vitae, such as information about a person's education, employment history, skills, professional organizations, and so on. With some social networking services, a member's profile may be viewable to the public by default, or alternatively, the member may specify that only some portion of the profile is to be public by default. Accordingly, many social networking services serve as a sort of directory of people to be searched and browsed.

DESCRIPTION OF THE DRAWINGS

Some embodiments are illustrated by way of example and not limitation in the FIG's. of the accompanying drawings, in which:

FIGS. 5 and 6 are example user interface illustrations showing an example of a member profile and a user interface element for requesting member profiles similar to the member profile being presented.

DETAILED DESCRIPTION

Figure 1:
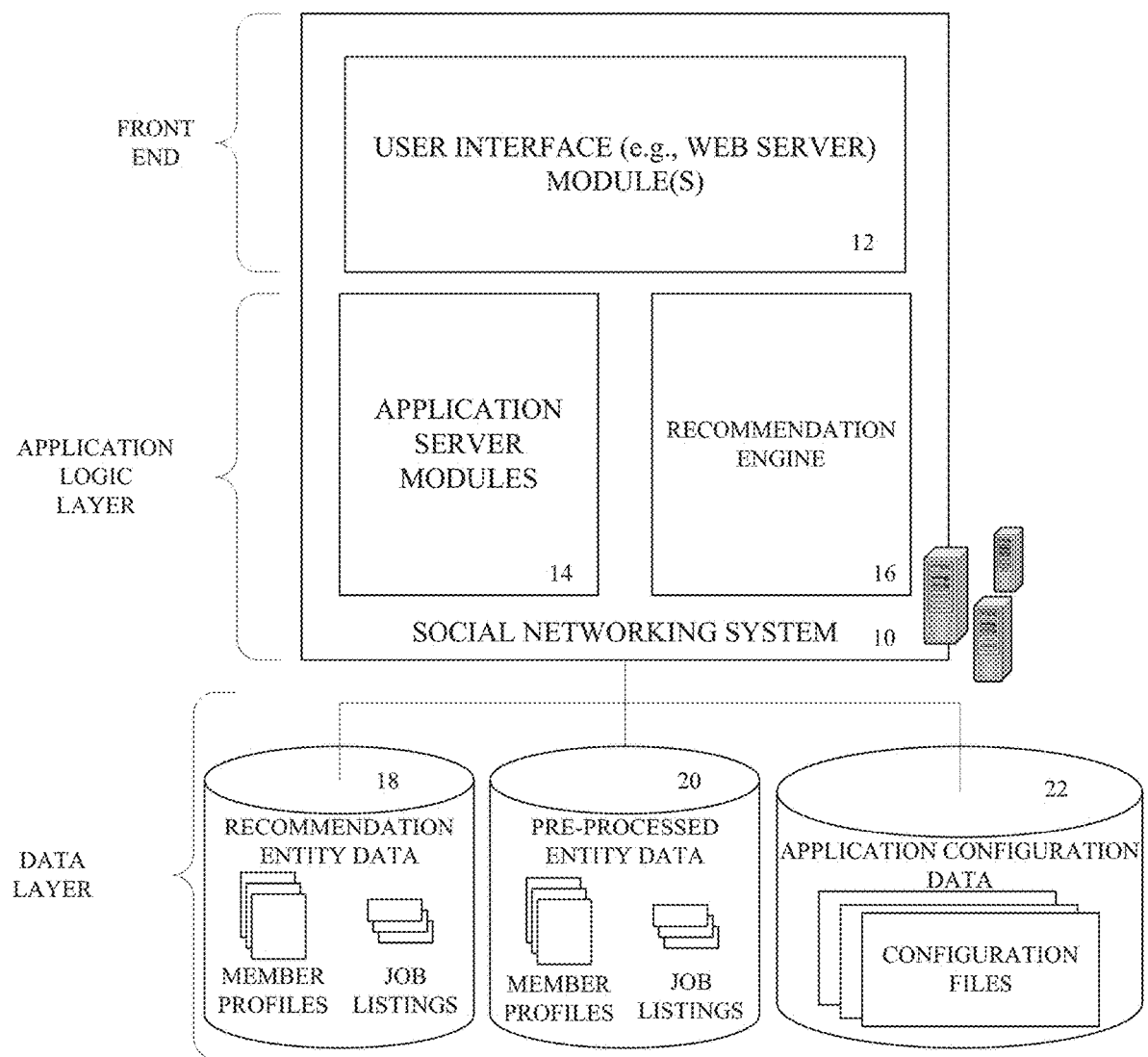
FIG. 1 is a block diagram illustrating various components of a social networking service with a recommendation engine, consistent with some embodiments of the invention, for identifying similarities between different entity types, such as member profiles, job listings, groups, and so forth.

The present disclosure describes methods and systems for identifying target member profiles that are similar to a source member profile, for members of a social networking service. In the following description, for purposes of explanation, numerous specific details are set forth in order to provide a thorough understanding of the various aspects of different embodiments of the present invention. It will be evident, however, to one skilled in the art, that the present invention may be practiced without all of the specific details.

Consistent with embodiments of the invention, and as described in detail herein, a social or business networking service includes the necessary logic to identify member profiles that are similar to a given member profile. For purposes of the present disclosure, the given member profile, which serves as input to a member profile matching algorithm or process, is referred to herein as a "source member profile." To distinguish from the source member profile, the member profiles that are determined to be similar to the source member profile are referred to herein as "target member profiles." The ability to accurately identify target member profiles similar to a source member profile will find practical application in a great number of scenarios. In some applications, a user may select the source member profile, and the target member profiles may then be identified and presented to the user. For example, upon receiving a request to present member profiles similar to another particular source member profile, the social networking service will, in real-time, analyze a variety of member profiles to select the particular target member profiles that have the highest similarity scores with respect to the source member profile. After identifying the most similar member profiles (e.g., those with the highest similarity scores), the social networking service may present the viewer who initiated the request with a list of a number of selected target member profiles. In some instances, the list will be presented with member profile summaries, which, if selected, will cause a detailed view of the selected member profile to be presented. In addition, with some embodiments, the requesting viewer may filter or further refine the list of member profiles by specifying various profile features as filter criteria and/or sort criteria, and so forth.

Accordingly, using a social or business networking service consistent with an embodiment of the invention, a job recruiter viewing a first member's profile can simply select a user interface (UI) element (e.g., a button or link) to generate a list of other member profiles that are similar to the first member's profile. Accordingly, if the first member profile is of interest to a job recruiter, for example, because the first member profile seems to match or otherwise fulfil many of the requirements for a particular job listing, the job recruiter can very quickly identify other members of the social networking service who have member profiles similar to the first member, thereby increasing the pool of potential job candidates to be targeted for a particular job opening or job listing.

In other applications, the source member profile may be selected, not by a user, but by an application or process. For example, with some embodiments, an application or process may select a source member profile because the source member profile has certain characteristics. For instance, a group recommendation service or feature may recommend to members of the social networking service that they join particular groups hosted by the social networking service that are likely to be of interest to the social networking service members, based on the fact that the members have member profiles that are similar to a model member profile generated based on an analysis of the member profiles of all members in the group. Accordingly, a source member profile may be generated based on the aggregate member profile information of all members common to the group. The recommendation service may then select this source member profile as an input to the member profile matching algorithm, and identify target member profiles that are similar to the model source member profile for the group. For each target member profile that is determined to be similar to the selected source member profile for a particular group, the recommendation service may recommend to a member having a member profile similar to that model profile for that group, that the member join the group if not already a member of the group.

As will be described in greater detail below, with some embodiments of the invention, the ability to accurately identify in real-time a set of member profiles most similar to a source member profile is achieved with a general recommendation engine. Accordingly, at least with some embodiments, the recommendation engine provides a recommendation service that can be customized for use with a great number of applications or services. For instance, in addition to identifying similarities between different member profiles, the recommendation engine can be configured to process other recommendation entity types to identify similarities between the recommendation entities. For purposes of the present disclosure, a recommendation entity is simply a collection of information organized around a particular concept that is supported by the social networking service in general, and the recommendation engine in particular. For instance, some examples of recommendation entities are: member profiles, jobs or job listings, interest groups, companies, advertisements, events, news, discussions, tweets, questions and answers, and so forth. Accordingly, with some embodiments, by specifying the particular features of two recommendation entities to be compared, and by specifying a particular algorithm for use in generating a similarity score for the two recommendation entities, the recommendation engine can be configured and customized to perform such tasks as: generate similarity scores for use in recommending job listings to a member; generate similarity scores for use in recommending particular interest groups that a user might be interested in joining; generate similarity scores for use in displaying an appropriate or relevant advertisement to a particular member, and many others.

In general, the recommendation engine operates in two phases. In the first phase, the data representing each individual instance of a particular recommendation entity (e.g., a member profile, a job listing, a group, and so forth) is processed by a feature extraction engine to extract the relevant features on which matching analysis is to be performed. For instance, in the case of a member profile, only certain portions of a member's profile (referred to herein as features) may be selected for use in determining the similarity of any two member profiles. As such, during the first phase, a feature extraction engine processes each member profile to extract the relevant profile features from each member profile. In addition to simply extracting certain features from relevant recommendation entities, the feature extraction engine may derive certain features based on other information included in the recommendation entity (e.g., member profile). Continuing with the example of member profiles, one feature that may be used to identify similar member profiles is work experience, measured in the number of years since a member graduated from school. While this number is not typically included as raw data in a member's profile, it may be derived with a simple calculation if the member's graduation date is specified in the member's profile. In addition, with some embodiments, the feature extraction engine may standardize and/or normalize various features, such as a member's job or position title, or, the name of a company at which a member has indicated being employed. With some embodiments, certain profile features may be retrieved from external data sources, using other information included in the recommendation entity as part of a query to the external data source.

The first phase may occur in real-time or in the background (e.g., offline, as part of a batch process), and in some embodiments, due to the large amounts of data being processed, is achieved via a parallel or distributed computing platform. Once the relevant features have been extracted, computed, derived, or retrieved, for each recommendation entity, these relevant features are stored as a pre-processed recommendation entity. For instance, in the case of a member profile, the feature extraction process results in an enhanced member profile that includes only the relevant features extracted from a member's profile as well as any derived or retrieved profile features. This pre-processed enhanced profile is used during the recommendation engine's second phase, when the matching engine compares the relevant profile features for one member against each target member profile until those member profiles with the highest similarity scores are identified. For example, during the second phase, the matching engine of the recommendation engine uses a configuration file that is customized for the particular analysis being performed. For example, a first configuration file (referred to herein as a profile matching configuration file) may exist for use in identifying member profiles similar to a source member profile, whereas a second configuration file—specifying different features from different recommendation entities to be compared, and a different algorithm for computing the matching scores—may be specified for determining the job listings that are most likely to be of interest to a particular member. As such, by configuring the feature extraction engine to extract relevant data from certain recommendation entities, and customizing the analysis performed by the matching engine with an appropriate configuration file, a wide variety of recommendation operations can be achieved with the general recommendation engine. Other advantages and aspects of the presently described inventive subject matter will be apparent from the description of the various FIG.s included herewith.

FIG. 1 is a block diagram illustrating various components of a social networking system 10 with a recommendation engine 12 for identifying similarities between different recommendation entity types (e.g., such as member profiles, job listings, groups, advertisements, and so forth), consistent with some embodiments of the invention. As shown in FIG. 1, the social networking system 10 is generally based on a three-tiered architecture, consisting of a front-end layer, application logic layer, and data layer. As is understood by skilled artisans in the relevant computer and Internet-related arts, each module or engine shown in FIG. 1 represents a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 1. However, a skilled artisan will readily recognize that various additional functional modules and engines may be used with a social networking system such as that illustrated in FIG. 1, to facilitate additional functionality that is not specifically described herein. Furthermore, the various functional modules and engines depicted in FIG. 1 may reside on a single server computer, or may be distributed across several server computers in various arrangements.

As shown in FIG. 1, the front end consists of a user interface module (e.g., a web server) 12, which receives requests from various client computing devices, and communicates appropriate responses to the requesting client devices. For example, the user interface module(s) 12 may receive requests in the form of Hypertext Transport Protocol (HTTP) requests, or other web-based, application programming interface (API) requests. The application logic layer includes various application server modules 14, which, in conjunction with the user interface module(s) 12, generates various user interfaces (e.g., web pages) with data retrieved from various data sources in the data layer. With some embodiments, individual application server modules 14 are used to implement the functionality associated with various services and features of the social networking service. For instance, the ability to identify member profiles similar to a user-selected source member profile—a service that may be recognized by the name, "People Like This" or "Profiles Similar to This"—may be a service implemented in an independent application server module 14. Similarly, other applications or services that utilize the recommendation engine 16 will be embodied in their own application server modules 14.

As shown in FIG. 1, the data layer includes several databases, such as a database 18 for storing recommendation entity data, for example, such as member profiles, job listings, interest groups, companies, advertisements, events, news, discussions, tweets, questions and answers, and so forth. With some embodiments, the recommendation entity data is processed in the background (e.g., offline) to generated pre-processed entity data, that can be used by the recommendation engine, in real-time, to make recommendations generally, and to identify member profiles similar to a source member profile, specifically. For example, the recommendation engine 16 may retrieve and process member profile data in the database with reference number 20 to identify member profiles similar to a source member profile. The database with reference number 22 in FIG. 1 is shown to be storing application configuration data, including one or more configuration files for use with the recommendation engine 16, as described in greater detail in connection with the description of FIG. 2.

Consistent with some embodiments, when a person initially registers to become a member of the social networking service, the person will be prompted to provide some personal information, such as his or her name, age (e.g., birthdate), gender, interests, contact information, home town, address, the names of the member's spouse and/or family members, educational background (e.g., schools, majors, etc.), employment history, skills, professional organizations, and so on. This information is stored, for example, in the database with reference number 18.

Once registered, a member may invite other members, or be invited by other members, to connect via the social networking service. A "connection" may require a bi-lateral agreement by the members, such that both members acknowledge the establishment of the connection. Similarly, with some embodiments, a member may elect to "follow" another member. In contrast to establishing a "connection", the concept of "following" another member typically is a unilateral operation, and at least with some embodiments, does not require acknowledgement or approval by the member that is being followed. When one member follows another, the member who is following may receive automatic notifications about various activities undertaken by the member being followed.

The social networking service may provide a broad range of other applications and services that allow members the opportunity to share and receive information, often customized to the interests of the member. For example, with some embodiments, the social networking service may include a photo sharing application that allows members to upload and share photos with other members. With some embodiments, members may be able to self-organize into groups, or interest groups, organized around a subject matter or topic of interest. With some embodiments, members may subscribe to or join groups affiliated with one or more companies. For instance, with some embodiments, members of the social networking service may indicate an affiliation with a company at which they are employed, such that news and events pertaining to the company are automatically communicated to the members. With some embodiments, members may be allowed to subscribe to receive information concerning companies other than the company with which they are employed. With many of these applications and services, one or more recommendation entities are involved. For instance, in addition to identifying member profiles that are similar to a source member profile, the recommendation engine 16 may be configured and customized to identify groups, companies or photos that are likely to be of interest to a particular member.

Figure 2:
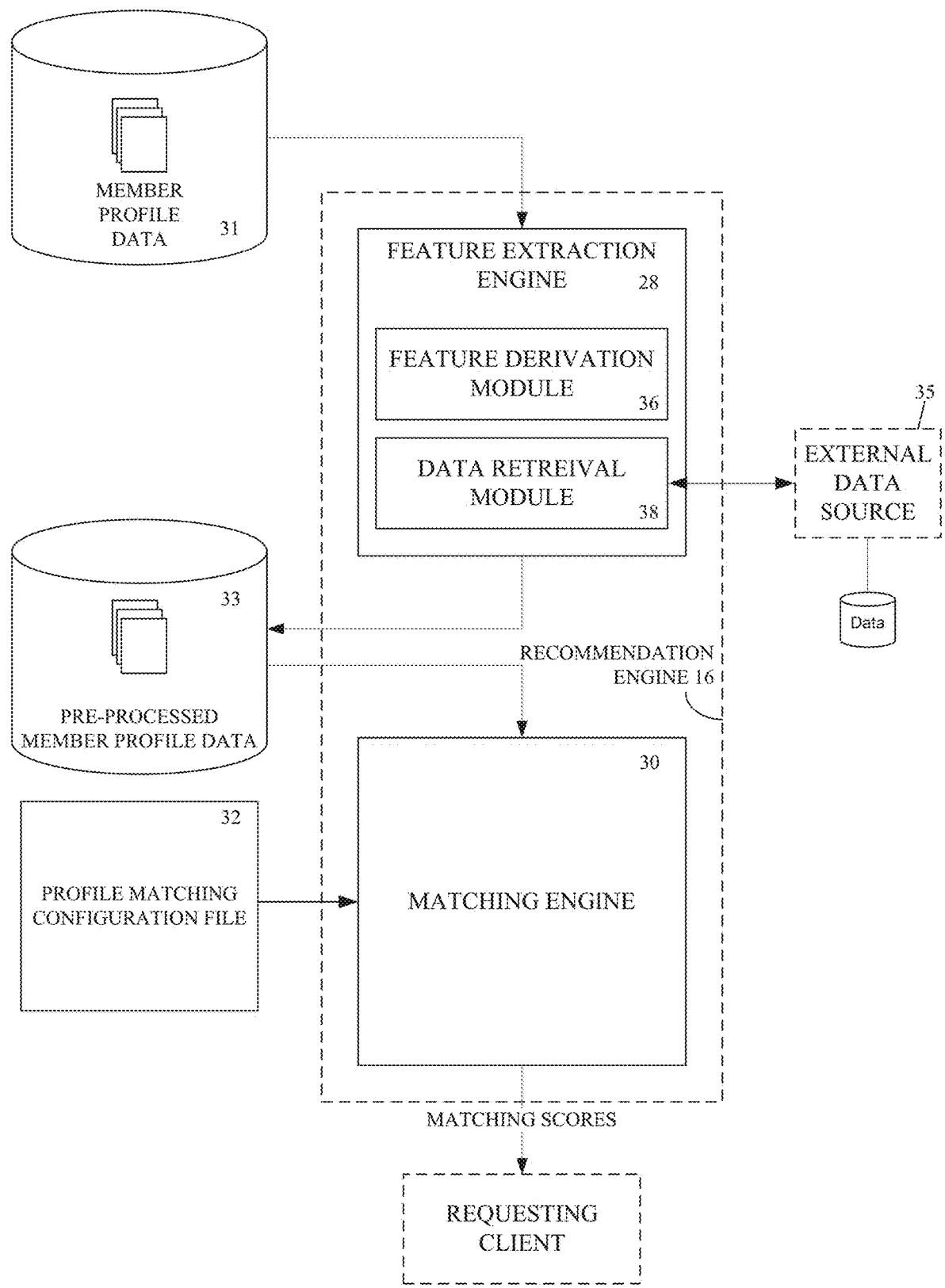
FIG. 2 is a block diagram showing some of the components or modules that comprise a recommendation engine, consistent with some embodiments of the invention, and illustrates the flow of data that occurs when performing various portions of a method for identifying and presenting member profiles similar to a source member profile.

FIG. 2 is a block diagram showing some of the functional components or modules that comprise a recommendation engine 16, consistent with some embodiments, and illustrates the flow of data that occurs when performing various operations of a method for identifying and presenting member profiles that are similar to a source member profile. As illustrated in FIG. 2, the recommendation engine 16 consists of two primary functional modules—a feature extraction engine 28 and a matching engine 30. With some embodiments, the recommendation engine 16 is a general recommendation engine that can be configured and/or customized to identify similarities (and differences) between various entities other than member profiles. This is achieved, in part, by customizing the feature extraction engine 28 to extract various features from various recommendation entities, and then operating the matching engine under the direction of a particular configuration file to perform a particular type of matching operation that is specific to the requesting application. Accordingly, depending upon the particular inputs to the recommendation engine 16 and the desired outputs, different configuration files may be used to compare different features of different recommendation entities. For instance, to identify target member profiles that are similar to a source member profile, a particular configuration file (referred to herein as a profile matching configuration file) may be used, while different configuration files may be used to perform other tasks, such as identify jobs that a member may be interested in, or to identify other members that a member may know, and so forth.

In the case of identifying target member profiles similar to a source member profile, the profile matching configuration file 32 is used as an input to the matching engine 30 to specify the various member profile features that the matching engine is to extract from the pre-processed member profile data 33 and to compare. In addition, the profile matching configuration file 32 is used to specify the exact algorithm for comparing profile features and generating an overall matching score.

In general, each member's profile data 31 is provided as input to the feature extraction engine 28, processed by the feature extraction engine 28, and then output and stored as pre-processed member profile data 33. With some embodiments, the feature extraction engine 28 may extract only relevant features from whatever recommendation entity is being processed by the feature extraction engine. So, for example, in the case of a member profile, the feature extraction engine 28 may extract only the profile features that are necessary for making the determination of whether any two member profiles are similar. However, in some embodiments, all features are extracted, while only certain features are further processed or refined.

As shown in FIG. 2, the feature extraction engine 28 includes a feature derivation module 36 and a data retrieval module 38. With some embodiments, the feature derivation module 36 derives certain features (e.g., profile features) based on the data input to the feature extraction engine. For instance, in the case of member profiles, the feature derivation module 36 may derive one or more profile features from the information included in a member's profile. Similarly, the data retrieval module 38 may utilize information input to the feature extraction engine 28 to formulate a query that is communicated to an external data source 35. As such, the data retrieval module 38 of the feature extraction engine can retrieve various profile features from one or more external data sources, such that these retrieved profile features can be used to determine the similarity of any two member profiles.

In addition to deriving various profile features, and retrieving various profile features, the feature extraction engine 28 includes logic to normalize or standardize certain profile features. For instance, with some embodiments, a member may be prompted to provide his or her job title. Because job titles vary from one company to the next, and from one industry to the next, job titles need to be normalized or standardized before they are useful in determining similarities between two member profiles. For example, the simple job title, "analyst" will have very different meanings in different industries. By normalizing and/or standardizing the job titles and then writing the standardized and normalized job titles to each member's enhanced profile, the recommendation engine can make much more meaningful comparisons, and thereby provide much more accurate results when presenting target member profiles similar to a source member profile.

After the feature extraction engine 28 has generated the pre-processed member profile data 33, the matching engine 30 is able to process client requests to identify member profiles similar to a source member profile. With some embodiments, the client of the matching engine 30 may simply be a server-side application that is requesting the information from the matching engine 30. Accordingly, the requesting application may specify or determine the particular configuration file that is to be used by the matching engine 30 to perform the requested task and achieve the requested objective. In any case, when a request is received at the matching engine 30 to provide a list of member profiles similar to a source member profile, the matching engine 30 will use the profile matching configuration file 32 to determine the particular member profile features that are to be retrieved from the various enhanced member profiles. In addition, the profile matching configuration file 32 specifies the exact comparisons that are to be performed, and how the overall matching score is to be calculated. Accordingly, the particular profile matching configuration file 32 includes instructions or directives for use by the matching engine 30 to perform the necessary profile feature comparisons, and to generate the similarity scores for each member profile, such that the similarity score for each member profile indicates the similarity of the member profile with respect to the source member profile.

With some embodiments, the matching engine 30 will compare multiple individual profile features such that each compared profile feature results in a similarity score (referred to herein as a sub-score, to reflect that the sub-score is a component of the overall similarity score). Once each sub-score is determined, the sub-scores are combined in some manner indicated by the profile matching configuration file 32. That is, the profile matching configuration file 32 will dictate how the matching engine 30 is to weight and combine the individual similarity sub-scores to derive the overall similarity score for each member profile.

Figure 3:
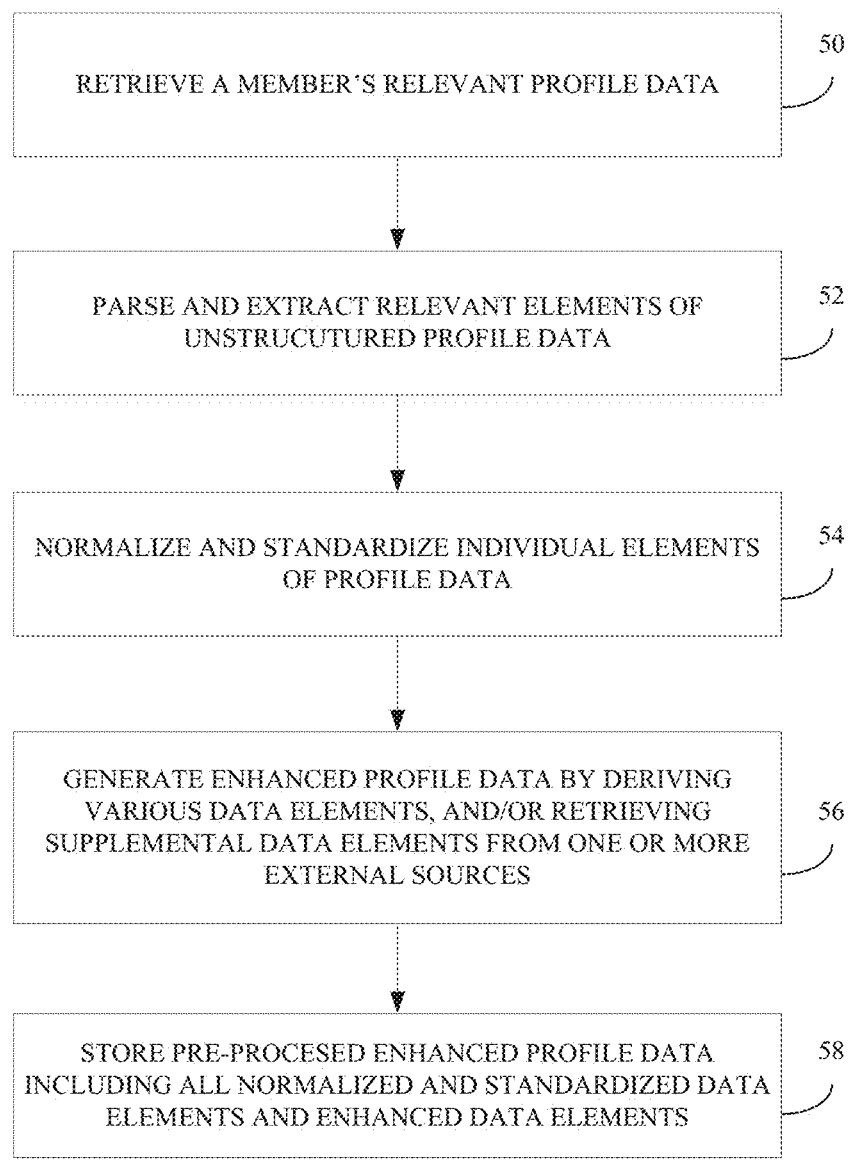
FIG. 3 is a flow diagram illustrating an example of the method operations involved in a method of pre-processing member profiles with a feature extraction engine to generate enhanced profiles for use by a matching engine, according to some embodiments of the invention.

FIG. 3 is a flow diagram illustrating an example of the method operations involved in a method of pre-processing member profiles with a feature extraction engine to generate enhanced profiles for use by a matching engine, according to some embodiments of the invention. While FIG. 3 provides an example method for extracting features of a member profile for use by an algorithm for identifying similar member profiles, similar method operations may be undertaken to extract other features of other recommendation entities, such as job listings, advertisements, companies or groups, and others. With some embodiments, some of the method operations illustrated in FIG. 3 may be performed offline by means of a batch process that is performed periodically (e.g., two times a day, daily, weekly, and so forth), while in other embodiments, the method operations may be performed online and in real-time as requests for similar member profiles are being received and processed.

The method begins when, at method operation 50, the relevant profile features for a member profile are retrieved. For instance, with some embodiments, the feature extraction engine is configured to extract only certain features from each member's profile information. Accordingly, the feature extraction engine may simply retrieve from a database the relevant data corresponding to the relevant profile features. With some embodiments, the retrieval may be as simple as performing a database look-up or fetch of the relevant data.

As some profile features may be free-form text (i.e., unstructured data), such as a description of a member's interest, skills, hobbies, career objectives, and so forth, at method operation 52 some of the relevant features that have been retrieved are parsed and extracted from their raw data format. Next, at method operation 54, one or more processes may be performed to either normalize or standardize one or more profile features. For instance, a member's job title may be standardized so that it can be more easily compared with others. Similarly, the name of a company that employees a member may be normalized, for example, to drop or add "Inc." or "Corporation" and so forth.

At method operation 56, the feature extraction engine may derive one or more profile features from raw data included in a member's profile. For example, with some embodiments, one or more enhanced profile features may be features that are derived from the raw data included in a member's profile. If, for example, a person's profile indicates the year that he or she graduated from college, an enhanced feature that can be derived from this raw data may include the number of years of work experience after college. In addition, some profile features may include data received from a data source external to the social networking service. Accordingly, data from a member's profile (e.g., a name, or other identifying data) may be used to query an external data source for additional information about the member.

Finally, at method operation 58, the relevant profile features, including any extracted profile features, derived profile features, normalized or standardized profile features, or any retrieved profile features are written to storage as a pre-processed, enhanced member profile. As described in connection with the description of FIG. 4, this pre-processed member profile data is ultimately used by the matching engine to generate similarity scores for respective member profiles, and to identify the member profiles that are the most similar to a source member profile.

Figure 4:
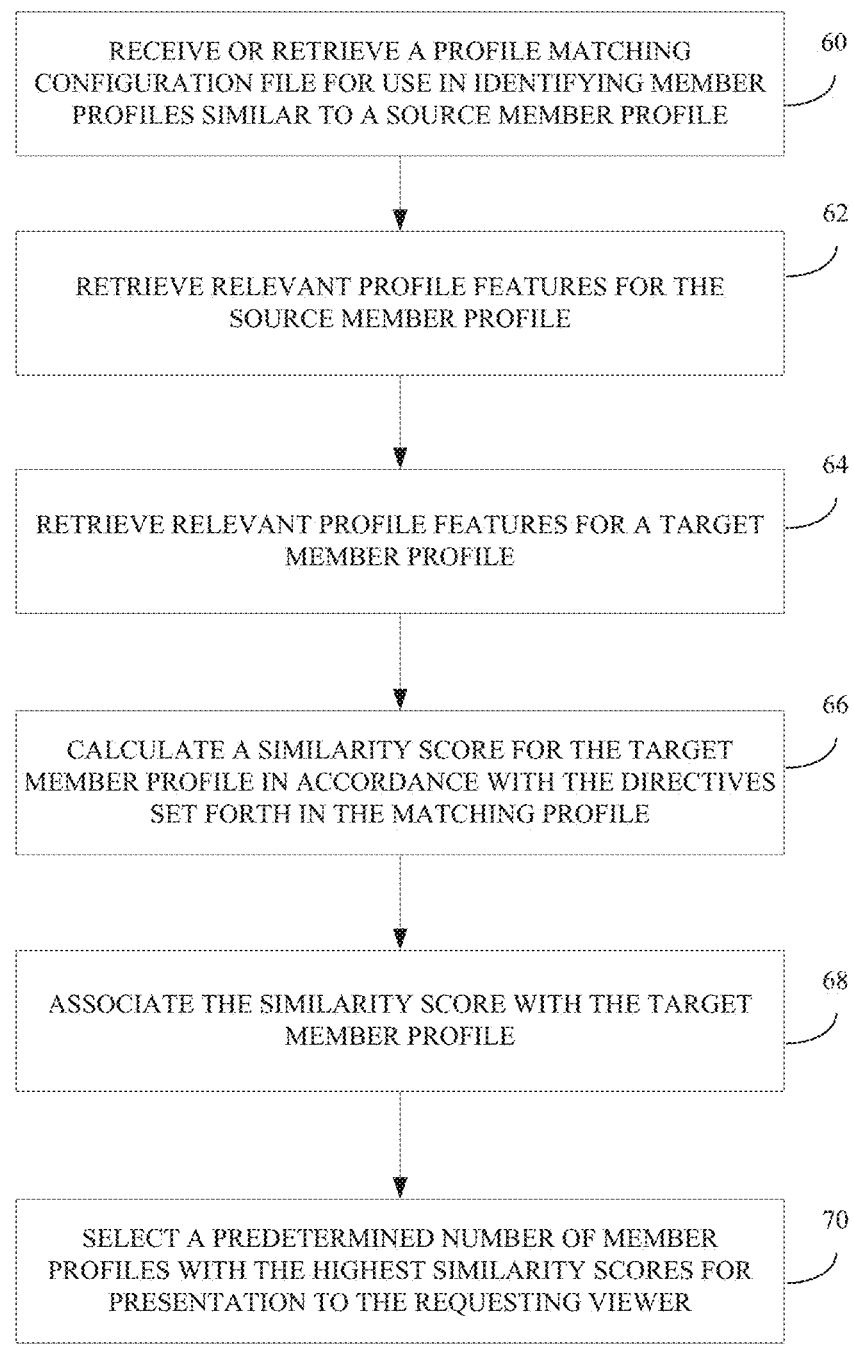
FIG. 4 is a flow diagram illustrating an example of the method operations involved in a method of generating similarity scores for member profiles with a matching engine, according to some embodiments of the invention.

FIG. 4 is a flow diagram illustrating an example of the method operations involved in a method of generating similarity scores for member profiles with a matching engine, according to some embodiments of the invention. The method begins at method operation 60 when the recommendation engine receives, retrieves, or otherwise reads or processes a profile matching configuration file. The profile matching configuration file, which may be a document formatted in Extensible Mark-up Language (XML) or in some other format, specifies the particular features (or, data elements) that are to be extracted or retrieved from a particular recommendation entity, such as an enhanced member profile. For example, in assessing the similarity between any two member profiles, the names of the persons may not play a role in determining the similarity of the profiles. As such, the profile matching configuration file may not include member's names as a feature to be extracted and compared. However, technical skills or professional organizations may be relevant to the analysis, and as such, these features may be specified in the profile matching configuration file, such that the data representing these features are ultimately retrieved and analyzed by the matching engine.

As discussed below, the profile matching configuration file specifies the particular features to be retrieved as well as the particular matching algorithms to be used for each of the retrieved features. For example, the profile matching configuration file indicates the exact algorithm or comparison operations that are to be performed for the various profile features specified in the profile matching configuration file, and how the various similarity sub-scores, resulting from the comparison of individual profile features, are to be combined to generate an overall similarity score. In some instances, the profile matching configuration file may indicate that a particular comparison is to be performed for a particular profile feature that results in a match only when there is an exact match. In other instances, a partial match may be indicated, and so forth. In some instances, the comparison may involve determining whether a particular profile features is within a particular distance of the same profile feature for the source profile and so forth. As such, the matching profile indicates not only the type of matching operation to be performed between a particular pair of profile features, but also the weight that should be applied to any resulting sub-score generated as a result of a match occurring between two profile features. With some embodiments, the weight applied to any particular sub-score may be dependent upon the extent to which two features match, as specified by a matching algorithm or rule in the profile matching configuration file.

At method operation 62, the relevant member profile features for the source member profile are retrieved. In some instances, the source profile may be selected by a user, while in other instances, an application or process selects a particular member profile for use as the source member profile. In any case, the relevant member profile features for the selected member profile are those member profile features specified in the profile matching configuration file obtained at method operation 60. With some embodiments, each member profile may have an identifier (e.g., such as a member identifier, or, member profile identifier). Accordingly, a request to identify member profiles similar to a source member profile may include an identifier identifying the source member profile. With this, the matching engine can retrieve the necessary profile features from the pre-processed, enhanced member profile for the particular member identified by the member identifier.

Next, at method operation 64, the matching engine retrieves the same set of profile features for a potential target member profile—that is, a member profile to be compared with the source member profile. With some embodiments, the particular member profiles that are compared may be selected based on some required matching criteria, either by default, or as specified by an application, process or user who has initiated the request. For instance, the matching analysis may be limited to only those members who share a particular feature in common, such as being employed by the same company, having attended the same school, having the same job title, and so forth. In other instances, the entire set of member profiles may be considered.

At method operation 66, the matching engine compares the various profile features and calculates a similarity score for the target member profile in accordance with the instructions or directives set forth in the profile matching configuration file. For instance, the profile matching configuration file indicates what comparison operation is to be performed for a pair of profile features, and how the various similarity sub-scores are to be combined to derive the overall similarity score. Once the overall similarity score is determined for the particular target member profile, the similarity score is associated with the target member profile at method operation 68, and the process, beginning with method operation 66, is repeated for additional member profiles, until all of a particular set of member profiles have been assigned similarity scores.

Finally, at method operation 70, once all the member profiles have a similarity score, indicating a level of similarity to the source member profile, a certain number of the member profiles with the highest similarity scores are selected for use with the particular requesting application. For example, if the similar member profiles have been requested by a user of the social networking service, the similar member profiles may be communicated to a client device of the user for presentation to the user—typically ordered based on their respective similarity score. As an example of one of the many applications that might perform this type of member profile comparison, an example of a user interface displaying a member profile, and a list of similar member profiles is presented in FIGS. 5 and 6.

With some embodiments, the number of member profiles that are selected and provided for use with a requesting application may be determined using some default or predetermined number. Alternatively, with some embodiments, the number of member profiles that are selected and provided to a particular requesting application may be configurable so that a certain number of the member profiles with the highest scores are provided. For example, with some embodiments, the profile matching configuration file specifies the number of member profiles that are to be returned to the requesting application. The number of member profiles may be specified explicitly (e.g., ten, thirty, one-hundred), or via a rule, such as, the top "X" number of member profiles, or all member profiles with a matching score exceeding "X", or some combination.

Figure 5:
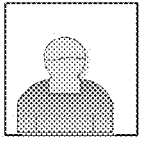

FIGS. 5 and 6 are user interface illustrations showing an example of a member profile and a user interface element for requesting member profiles similar to the member profile being presented. The user interface shown in FIG. 5, which could be representative of a web page, but could also presented via another application (e.g., such as on a mobile device, phone or tablet device) illustrates an example of a member profile for a member named, "Joe Hansen". In the left portion of the user interface, various member profile information is presented, to include the member's current job title, industry, current company of employment, prior company of employment, and so forth. If a viewer of the profile (i.e., another member or non-member of the social networking service) would like to see member profiles that are similar to Joe Hansen's member profile, the viewer can simply select the link or button labelled, "Find Similar Profiles" with reference number 80.

Upon selecting the link or button with reference number 80, a new user interface (e.g., web page) is presented to the viewing user, such as that shown in FIG. 6. As illustrated in FIG. 6, a new web page is presented to the viewer and the web page contains a list of member profiles that have been determined to be similar to Joe Hansen's member profile. For example, the example user interface shows three different member profiles, for members named, "Ted Smith", "Larry Johnson", and "Shawn P. D. Glidden". By selecting any one of the three member profiles, a more complete, full, member profile for the selected member profile may be displayed. In addition, on the left portion of this example user interface, several filtering criteria are presented, allowing the viewer to filter the search results by various features. For instance, the viewer may select only member profiles indicating current employment at a particular company, or specific educational requirements (e.g., school attended), and so forth.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules or objects that operate to perform one or more operations or functions. The modules and objects referred to herein may, in some example embodiments, comprise processor-implemented modules and/or objects.

Similarly, the methods described herein may be at least partially processor-implemented. For example, at least some of the operations of a method may be performed by one or more processors or processor-implemented modules. The performance of certain operations may be distributed among the one or more processors, not only residing within a single machine or computer, but deployed across a number of machines or computers. In some example embodiments, the processor or processors may be located in a single location (e.g., within a home environment, an office environment or at a server farm), while in other embodiments the processors may be distributed across a number of locations.

The one or more processors may also operate to support performance of the relevant operations in a "cloud computing" environment or within the context of "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Figure 7:
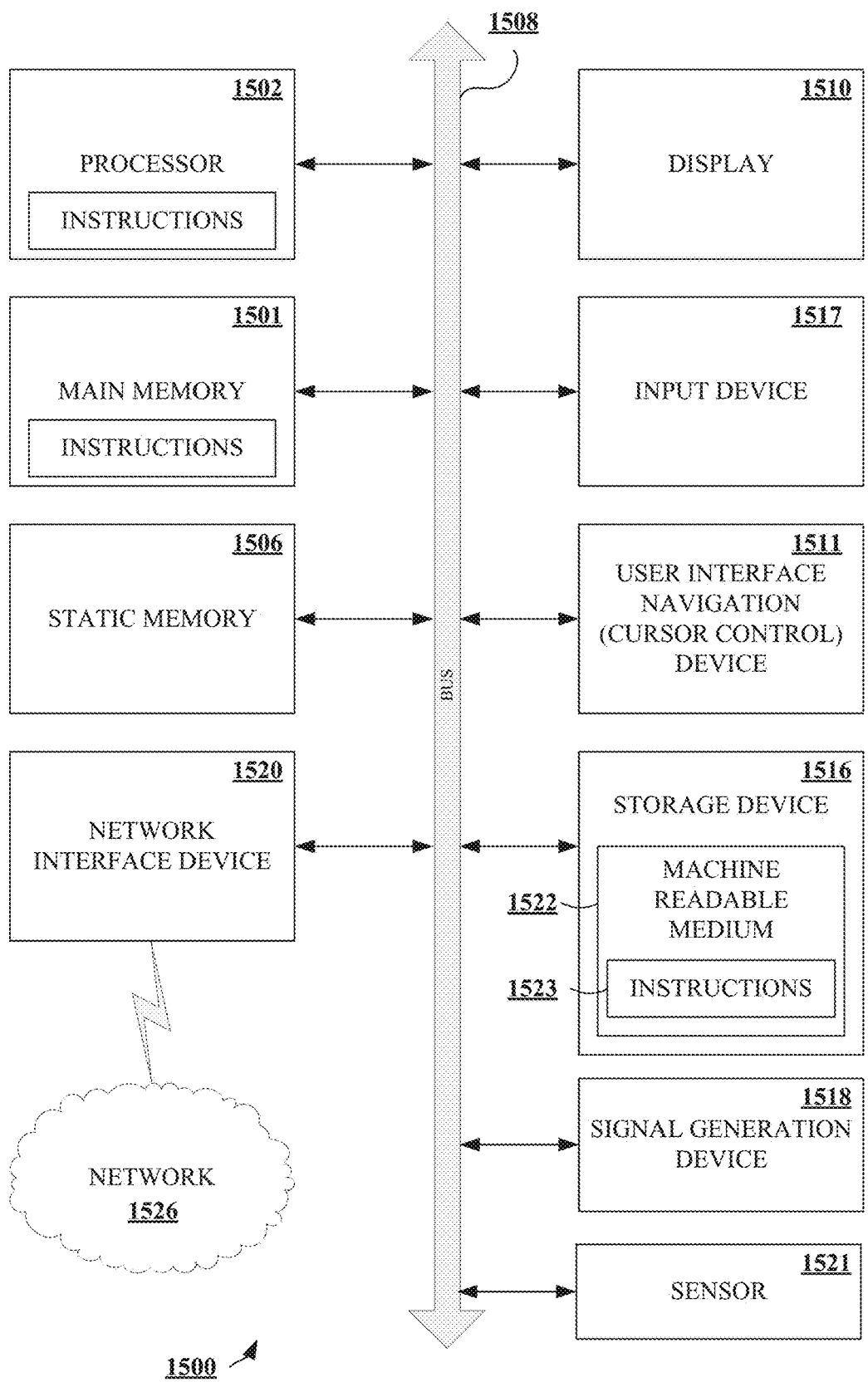
FIG. 7 is a block diagram of a machine in the form of a computing device within which a set of instructions, for causing the machine to perform any one or more of the methodologies discussed herein, may be executed.

FIG. 7 is a block diagram of a machine in the form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In a preferred embodiment, the machine will be a server computer, however, in alternative embodiments, the machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1501 and a static memory 1506, which communicate with each other via a bus 1508. The computer system 1500 may further include a display unit 1510, an alphanumeric input device 1517 (e.g., a keyboard), and a user interface (UI) navigation device 1511 (e.g., a mouse). In one embodiment, the display, input device and cursor control device are a touch screen display. The computer system 1500 may additionally include a storage device 1516 (e.g., drive unit), a signal generation device 1518 (e.g., a speaker), a network interface device 1520, and one or more sensors 1521, such as a global positioning system sensor, compass, accelerometer, or other sensor.

The drive unit 1516 includes a machine-readable medium 1522 on which is stored one or more sets of instructions and data structures (e.g., software 1523) embodying or utilized by any one or more of the methodologies or functions described herein. The software 1523 may also reside, completely or at least partially, within the main memory 1501 and/or within the processor 1502 during execution thereof by the computer system 1500, the main memory 1501 and the processor 1502 also constituting machine-readable media.

While the machine-readable medium 1522 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks: magneto-optical disks; and CD-ROM and DVD-ROM disks.

The software 1523 may further be transmitted or received over a communications network 1526 using a transmission medium via the network interface device 1520 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method comprising:
    identifying, by one or more processors, a reference profile representing a reference member of a social networking service;
    identifying, by one or more processors, a plurality of candidate profiles each representing a different candidate member of the social networking service;
    determining, by one or more processors, a separate similarity score for each of the plurality of candidate profiles, wherein the determining of the separate similarity score for a candidate profile in the plurality of candidate profiles comprises:
        accessing a plurality of profile features of the candidate profile;
        determining for each profile feature in the plurality of profile features a corresponding sub-score by comparing the profile feature with a corresponding profile feature of the reference profile, the sub-score indicating a measure of similarity between the profile feature of the candidate profile and the corresponding profile feature of the reference profile; and
        determining the similarity score for the candidate profile based on the sub-scores determined for the plurality of profile features, the similarity score indicating a measure of similarity between the candidate profile and the reference profile;
    selecting, by one or more processors, a subset of candidate profiles from the plurality of candidate profiles, based on the similarity scores determined for the subset of candidate profiles; and
    sending, by one or more processors to a client device, instructions to display information that identifies one or more candidate members represented by the selected subset of candidate profiles.

2. The method of claim 1, wherein:
the determining of the separate similarity score for each of the plurality of candidate profiles includes, for each similarity score:
accessing a part of a modified version of the candidate profile for comparison to a corresponding part of a modified version of the reference profile; and
determining a further sub-score that indicates a measure of similarity between the part of the modified version of the candidate profile and the corresponding part of the modified version of the reference profile; and wherein
the determining of the similarity score is based on the further sub-score.

3. The method of claim 2, wherein:
in the determining of each similarity score, the accessing of the part of the modified version of the candidate profile includes generating the part of the modified version from the candidate profile.

4. The method of claim 2, wherein:
in the determining of each similarity score, the accessing of the part of the modified version of the candidate profile includes receiving the part of the modified version of the candidate profile from a data source.

5. The method of claim 2, wherein:
the determining of the separate similarity score for each of the plurality of candidate profiles includes, for each similarity score:
generating the modified version of the reference profile by normalizing a portion of the reference profile.

6. The method of claim 5, wherein:
in the determining of each similarity score, the generating of the modified version of the reference profile includes normalizing a job title specified in the portion of the reference profile; and
in the determining of each similarity score, the determining of the further sub-score is based on the normalized job title.

7. The method of claim 5, wherein:
in the determining of the similarity score, the generating of the modified version of the reference profile includes normalizing a company name specified in the portion of the reference profile; and
in the determining of each similarity score, the determining of the further sub-score is based on the normalized company name.

8. The method of claim 1, further comprising:
accessing data that specifies the plurality of profile features to be accessed; and wherein
in the determining of the separate similarity score for each of the plurality of candidate profiles, the accessing of the plurality of profile features of the candidate profile is based on the accessed data that specifies the plurality of profile features to be accessed.

9. The method of claim 1, further comprising:
accessing data that specifies a comparison to be performed in comparing the reference profile to one or more of the candidate profiles; and wherein
in the determining of the separate similarity score for each of the plurality of candidate profiles, the determining of the corresponding sub-score for each of the plurality of profile features is based on the comparison specified by the accessed data.

10. The method of claim 1, further comprising:
accessing data that specifies an algorithm by which a score of the candidate profile is to be generated from sub-scores of profile features of the candidate profile; and wherein
the determining of the separate similarity score for each of the plurality of candidate profiles is based on the algorithm specified by the accessed data.

11. The method of claim 1, further comprising:
accessing data that specifies separate weighting factors to be applied to corresponding sub-scores of profile features of the candidate profile; and wherein
the determining of the separate similarity score for each of the plurality of candidate profiles is based on the weighting factors specified by the accessed data.

12. The method of claim 1, wherein:
a candidate profile among the candidate profiles describes a job listing; and
the information identifying candidate members represented by the selected subset of candidate profiles includes an identifier of the candidate profile that describes the job listing.

13. The method of claim 1, wherein:
a candidate profile among the candidate profiles describes a skill set; and
the information identifying candidate members represented by the selected subset of candidate profiles includes an identifier of the candidate profile that describes the skill set.

14. The method of claim 1, wherein:
a candidate profile among the candidate profiles describes a group of people; and
the information identifying candidate members represented by the selected subset of candidate profiles includes an identifier of the candidate profile that describes the group of people.

15. The method of claim 1, wherein:
a candidate profile among the candidate profiles describes an advertisement; and
the information identifying candidate members represented by the selected subset of candidate profiles includes an identifier of the candidate profile that describes the advertisement.

16. A non-transitory machine-readable storage medium comprising instructions that, when executed by one or more processors of a machine, cause the machine to perform operations comprising:
identifying a reference profile representing a reference member of a social networking service;
identifying a plurality of candidate profiles each representing a different candidate member of the social networking service;
determining a separate similarity score for each of the plurality of candidate profiles, wherein the determining of the separate similarity score for a candidate profile in the plurality of candidate profiles comprises:
accessing a plurality of profile features of the candidate profile;
determining for each profile feature in the plurality of profile features a corresponding sub-score by comparing the profile feature with a corresponding profile feature of the reference profile, the sub-score indicating a measure of similarity between the profile feature of the candidate profile and the corresponding profile feature of the reference profile; and
determining the similarity score for the candidate profile based on the sub-scores determined for the plurality of profile features, the similarity score indicating a measure of similarity between the candidate profile and the reference profile;
selecting a subset of candidate profiles from the plurality of candidate profiles, based on the similarity scores determined for the subset of candidate profiles; and
sending, to a client device, instructions to display information that identifies one or more candidate members represented by the selected subset of candidate profiles.

17. The non-transitory machine-readable storage medium of claim 16, wherein:
the determining of the separate similarity score for each of the plurality of candidate profiles includes, for each similarity score:
accessing a part of a modified version of the candidate profile for comparison to a corresponding part of a modified version of the reference profile; and
determining a further sub-score that indicates a measure of similarity between the part of the modified version of the candidate profile and the corresponding part of the modified version of the reference profile; and wherein
the determining of the similarity a score is based on the further sub-score.

18. The non-transitory machine-readable storage medium of claim 16, wherein the operations further comprise:
accessing data that specifies the plurality of profile features to be accessed; and wherein
in the determining of the separate similarity score for each of the plurality of candidate profiles, the accessing of the plurality of profile features of the candidate profile is based on the accessed data that specifies the plurality of profile features to be accessed.

19. A system comprising:
one or more processors; and
a memory storing instructions that, when executed by at least one processor among the one or more processors, cause the system to perform operations comprising:
identifying a reference profile representing a reference member of a social networking service;

identifying a plurality of candidate profiles each representing a different candidate member of the social networking service;

determining a separate similarity score for each of the plurality of candidate profiles, wherein the determining of the separate similarity score for a candidate profile in the plurality of candidate profiles comprises:

accessing a plurality of profile features of the candidate profile;

determining for each profile feature in the plurality of profile features a corresponding sub-score by comparing the profile feature with a corresponding profile feature of the reference profile, the sub-score indicating a measure of similarity between the profile feature of the candidate profile and the corresponding profile feature of the reference profile; and determining the similarity score for the candidate profile based on the sub-scores determined for the plurality of profile features, the similarity score indicating a measure of similarity between the candidate profile and the reference profile;

selecting a subset of candidate profiles from the plurality of candidate profiles, based on the similarity scores determined for the subset of candidate profiles; and sending, to a client device, instructions to display information that identifies candidate members represented by the selected subset of candidate profiles.

20. The system of claim 19, wherein:

the determining of the separate similarity score for each of the plurality of candidate profiles includes, for each similarity score:

accessing a part of a modified version of the candidate profile for comparison to a corresponding part of a modified version of the reference profile; and determining a further sub-score that indicates a measure of similarity between the part of the modified version of the candidate profile and the corresponding part of the modified version of the reference profile; and wherein the determining of the similarity score is based on the further sub-score.

* * * * *